(12) United States Patent
Hartsock et al.

(10) Patent No.: US 7,351,767 B2
(45) Date of Patent: Apr. 1, 2008

(54) COMPOSITION FOR MONOVINYLRENIC-BASED SHRINK LABEL FILMS

(75) Inventors: David L Hartsock, Bartlesville, OK (US); John M Brown, Bartlesville, OK (US); James A Keane, The Woodlands, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 281 days.

(21) Appl. No.: 10/974,411

(22) Filed: Oct. 27, 2004

(65) Prior Publication Data

US 2006/0089457 A1    Apr. 27, 2006

Related U.S. Application Data

(63) Continuation-in-part of application No. 10/784,143, filed on Feb. 20, 2004, now Pat. No. 7,193,014.

(51) Int. Cl.
*C08L 53/02* (2006.01)

(52) U.S. Cl. ................................. 525/93; 525/98

(58) Field of Classification Search ................. 525/93, 525/98
See application file for complete search history.

(56) References Cited

U.S. PATENT DOCUMENTS

| | | | |
|---|---|---|---|
| 3,639,517 A | 2/1972 | Kitchen et al. | |
| 4,086,298 A | 4/1978 | Fahrbach et al. | |
| 4,091,053 A | 5/1978 | Kitchen et al. | |
| 4,323,606 A | 4/1982 | Buck | |
| 4,386,125 A | 5/1983 | Shiraki et al. | |
| 4,386,190 A | 5/1983 | Bailey | |
| 4,418,180 A | 11/1983 | Heinz et al. | |
| 4,628,073 A | 12/1986 | Fisher | |
| 4,704,435 A * | 11/1987 | Kitchen ...................... | 525/250 |
| 5,134,199 A | 7/1992 | Hattori et al. | |
| 5,223,577 A | 6/1993 | Baumgartner et al. | |
| 5,426,149 A * | 6/1995 | Skarlupka ................... | 524/504 |
| 5,436,298 A | 7/1995 | Moczygemba et al. | |
| 5,466,499 A | 11/1995 | Takagi et al. | |
| 5,510,423 A | 4/1996 | Van Dijk et al. | |
| 5,587,425 A | 12/1996 | Moczygemba et al. | |
| 5,705,569 A | 1/1998 | Moczygemba | |
| 5,753,326 A | 5/1998 | Blackwelder | |
| 5,756,577 A | 5/1998 | Gutierrez-Villarreal | |
| 5,854,353 A | 12/1998 | Knoll et al. | |
| 6,107,411 A | 8/2000 | Toya et al. | |
| 6,270,866 B1 | 8/2001 | Okuda et al. | |
| 6,413,596 B1 | 7/2002 | Okuda et al. | |
| 6,495,643 B1 | 12/2002 | Evans et al. | |
| 6,841,261 B2 * | 1/2005 | Matsui et al. ............... | 428/521 |
| 2003/0004267 A1 * | 1/2003 | Swisher et al. ............. | 525/98 |
| 2003/0166774 A1 * | 9/2003 | Hoshi et al. ................ | 525/88 |
| 2005/0187344 A1 * | 8/2005 | Wilkey et al. .............. | 525/88 |
| 2005/0222331 A1 * | 10/2005 | Hoshi et al. ................ | 525/88 |
| 2006/0211818 A1 | 9/2006 | Kurimura et al. | |
| 2007/0027257 A1 | 2/2007 | Kobashi et al. | |
| 2007/0043168 A1 | 2/2007 | Montiel-Ortiz et al. | |
| 2007/0093601 A1 | 4/2007 | Watanabe et al. | |
| 2007/0098933 A1 | 5/2007 | Opuszko et al. | |

OTHER PUBLICATIONS

Patent Abstracts of Japan, vol. 2003, No. 12, Dec. 12, 2003, PS Japan Corp., 1 page.
International Search Report and Written Opinion, PCT/US05/038717, Mar. 3, 2006, 10 pages.
Hsieh, Henry L, et al., "Kinetics of alkylithium initiated polymerizations", Rubber Chemistry and Technology, (1970), 43(1), 22-73.
Kraus, Gerald, et al., "Morphology and dynamic viscoelastic behavior of blends of styrene-butadiene block copolymers", Adv. Chem. Ser., (1979), 176, 277-292.
Knoll, Konrad, et al. "Styrolux and styroflex. From transparent high impact polystyrene to new thermoplastic elastomers. Syntheses, applications, and blends with other styrene -based polymers", Macromolecular Symposia (1998), 132 (international Symposium on Ionic Polymerization, 1997), 231-243.

* cited by examiner

*Primary Examiner*—Jeffrey Mullis
(74) *Attorney, Agent, or Firm*—Fletcher Yoder

(57) ABSTRACT

We disclose a composition comprising (i) a monovinylarene-conjugated diene copolymer and (ii) an acrylate terpolymer. The composition can be in the form of a film. We also disclose a container comprising a container structure and a shrink label in contact with the container structure's exterior surface. We also disclose a method of applying a shrink label to a container structure.

36 Claims, 3 Drawing Sheets

COMPOSITION FOR MONOVINYLRENIC-BASED SHRINK LABEL FILMS

CROSS REFERENCE TO RELATED APPLICATIONS

This application is a continuation-in-part of U.S. patent application Ser. No. 10/784,143, filed Feb. 20, 2004 now U.S. Pat. No. 7,193,014.

BACKGROUND OF THE INVENTION

1. Field of the Invention

The present invention relates generally to the packaging field. More particularly, it concerns monovinylarene-conjugated diene copolymers and compositions thereof.

2. Description of Related Art

Shrink labels are known for use in labeling preformed packages or sealing the closures of preformed packages. Examples of such uses of shrink labels include, but are not limited to, labels on contoured bottles of beverages and containers of prepackaged foods and tamper-evident seals over the caps of pharmaceutical bottles, among others.

Two materials frequently used in shrink labels are polyvinylchloride (PVC) and glycol-modified polyethylene terephthalate glycol (PETG). PETG is generally considered to have a relatively low glass transition temperature and a relatively high shrinkage upon exposure to heat, and as a result has been frequently used in shrink film applications. However, PETG is relatively expensive and has low melt strength, low heat deflection temperature, a tendency to absorb moisture, and relatively high specific gravity. Polyvinyl chloride (PVC) is relatively inexpensive, and has been used in shrink label packaging applications, but its poorer shrink performance, relatively high specific gravity, formation of corrosive and hazardous gases during extrusion, and a negative public perception of plasticizers often used to soften PVC and several of its incineration products render it less desirable.

Styrenic polymers, including styrene-butadiene copolymers, do not have these disadvantages. However, it remains challenging to produce shrink labels containing styrene-butadiene copolymers that have clarity, toughness, and shrink properties competitive with PVC or PETG.

SUMMARY OF THE INVENTION

In one embodiment, the present invention relates to a composition comprising (i) a monovinylarene-conjugated diene copolymer and (ii) an acrylate terpolymer.

In another embodiment, the present invention relates to a heat shrinkable film, comprising the composition referred to above.

In another embodiment, the present invention relates to a container, comprising a container structure having an exterior surface and a shrink label in contact with at least a portion of the exterior surface, wherein the shrink label comprises the composition referred to above.

In a further embodiment, the present invention relates to a method of applying a label to a container, comprising shrinking (a) a shrink label comprising the composition referred to above to (b) at least a portion of the exterior surface of a container structure.

The present invention may provide compositions that may be no more expensive than PETG but may have shrink-label-application physical properties no worse than PVC. Compositions having other qualities, however, are contemplated as being part of the present invention.

Advantages and other features of the invention will become apparent from the following description and from the claims.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
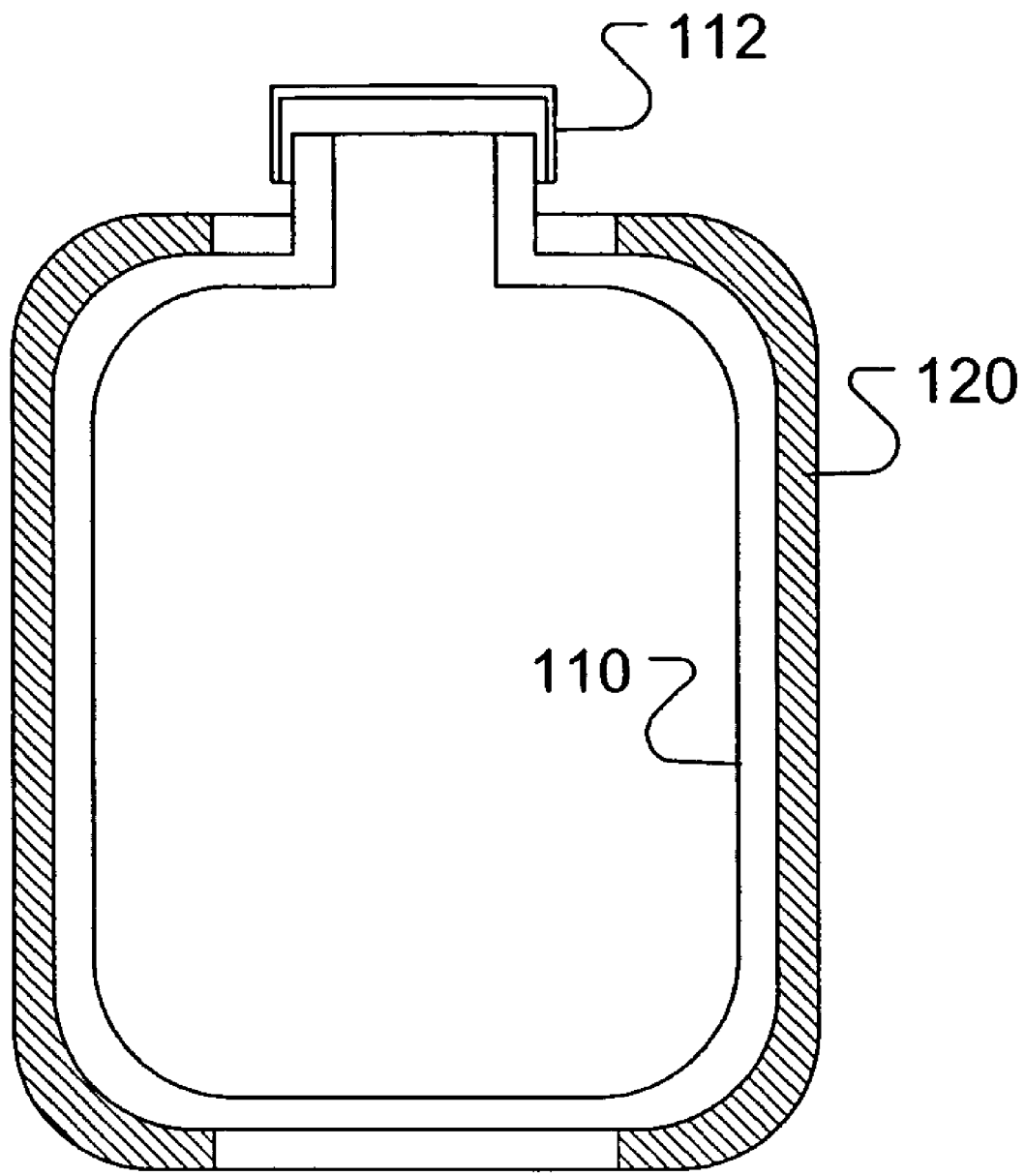
FIG. 1 presents a cross-sectional view of a container structure according to one embodiment of the present invention.

In one embodiment, the present invention relates to a composition, comprising (i) a monovinylarene-conjugated diene copolymer and (ii) an acrylate terpolymer.

The composition comprises a blend of the two polymers, as will be discussed in more detail below. Any physical form of the blend is a composition, as the term is used herein. By way of example only, the composition can be in the form of a melt, pellets, a solution of the polymers in a solvent, one or more layers in a single-layer or multi-layer film, (such as a shrink label, among others).

Unless specified to the contrary or apparent from the plain meaning of a phrase, the word "or" has the inclusive meaning. The adjectives "first," "second," and so forth are not to be construed as limiting the modified subjects to a particular order in time, space, or both, unless specified to the contrary. A "copolymer" is used herein to refer to any polymer comprising at least two types of units, e.g., two types of units, three types of units, etc.

The basic starting materials and polymerization conditions for preparing monovinylarene-conjugated diene block copolymers are disclosed in, e.g., U.S. Pat. Nos. 4,091,053; 4,584,346; 4,704,434; 4,704,435; 5,130,377; 5,227,419; 6,265,484; 6,265,485; 6,420,486; and 6,444,755, which are hereby incorporated herein by reference. The techniques taught therein are generally applicable to the preparation of the monovinylarene-conjugated diene rubbers discussed below.

"Monovinylarene," as used herein, refers to an organic compound containing a single carbon-carbon double bond, at least one aromatic moiety, and a total of 8 to 18 carbon atoms, such as 8 to 12 carbon atoms. Exemplary monovinylarenes include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. In one embodiment, the monovinylarene is styrene. A unit of polymer, wherein the unit is derived from polymerization of a monovinylarene monomer, is a "monovinylarene unit."

"Conjugated diene," as used herein, refers to an organic compound containing conjugated carbon-carbon double bonds and a total of 4 to 12 carbon atoms, such as 4 to 8 carbon atoms. Exemplary conjugated dienes include, but are not limited to, 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. In one embodiment, the conjugated diene can be 1,3-butadiene or isoprene. A unit of polymer, wherein the unit is derived from polymerization of a conjugate diene monomer, is a "conjugated diene unit."

A "monovinylarene-conjugated diene block copolymer" is a polymer comprising monovinylarene units and conjugated diene units. The polymer comprises one or more blocks, wherein each block comprises monovinylarene units or conjugated diene units. Any particular block can comprise either or both monovinylarene units or conjugated diene units. If it comprises only one type of units, it can be termed a "monoblock." If it comprises both, it can be a random block, a tapered block, a stepwise block, or any other type of block. In the present invention, "monovinylarene-conjugated diene block copolymer" does not include monovinylarene-conjugated diene rubbers, as defined below.

A block is "tapered" when both (a) the mole fraction of conjugated diene units in a first section of the block is higher than the mole fraction of conjugated diene units in a second section of the block, wherein the second section of the block is closer to a given end of the block and (b) condition (a) is true for substantially all sections of the block. (Depending on the size of the sections being considered, condition (a) may not be true for all sections, but if so, will be not true at no more than about the level expected by chance).

A block is "stepwise" when a first section of the block contains substantially all monovinylarene units of the block and a second section of the block contains substantially all conjugated diene units of the block. In light of the above definition, the first section is not necessarily prior to the second section in time, space, or any other parameter.

A block is "random" when the mole fractions of conjugated diene units and monovinylarene units in a section of the block are substantially the same as the mole fractions of conjugated diene units and monovinylarene units in the entire block. This does not preclude the possibility of sections of the block having regularity (i.e., appearing non-random), but such regular sections will typically be present at no more than about the level expected by chance.

In one embodiment, the monovinylarene-conjugated diene copolymer is a block copolymer comprising styrene blocks and butadiene blocks (a "styrene-butadiene copolymer"). An exemplary styrene-butadiene copolymer is commercially available under the K-Resin® trademark (Chevron Phillips Chemical Co., The Woodlands, Tex.).

More generally, the copolymers are characterized as resinous, polymodal, copolymers of at least one conjugated diene with at least one monovinylarene, and are prepared so that at least a portion of the final product is of a coupled character, linear or radial or both. The copolymers contain about 55 to 95, preferably 60 to 87, more preferably 70 to 80, percent by weight of copolymerized monovinyl aromatic compound (monovinylarene), and correspondingly about 45 to 5, 40 to 13, or 30 to 27, percent by weight of copolymerized conjugated diene. The coupled portions of the resinous, polymodal copolymers have terminal polymonovinylarene blocks on the extending arms of each linear or radial copolymer molecule, and further contain a central internal block of polyconjugated diene, ignoring any interruption of the internal block by a coupling agent residue. The resinous copolymeric polymodal products may also contain portions of linear uncoupled block copolymers of poly (monovinylarene)-poly(conjugated diene).

The copolymers are generally prepared by a process of sequential charge copolymerization comprising the solution polymerization of at least two charges each of a conjugated diene monomer, a monovinylarene monomer, and a monoalkali metal initiator, at least one charge of conjugated diene monomer precedes the last charge of alkali metal initiator, at least one charge each of monovinylarene and of conjugated diene follow the last charge of monoalkali metal initiator, and the last charge of monomer is a charge of conjugated diene, such that the number of charges of each of the three components is not more than three, and the total of the charges of the three components is 8 or 9. Each monomer charge is allowed to polymerize to substantial completion prior to the next monomer charge, if any.

The resinous, polymodal block copolymers can be prepared by various modifications (modes) of the above general procedure. As indicated, the block copolymers of each mode are made up of non-tapered monoblocks. In accordance with one aspect of the invention, the following copolymeric species are considered to be formed prior to coupling in accordance with the sequence of addition of monomers and initiator:

Mode A
S1-B1-S2-B2-S3-B3-L
S2-B2-S3-B3-L
S3-B3-L

Each of "S1", "S2", and "S3" indicates a block of substantially homopolymeric polymonovinylarene, formed in appropriate sequence by addition of the monovinylarene monomer and polymerization thereof under solution polymerization conditions such that substantially complete polymerization of the monomer charge is obtained before the next step of monomer or initiator addition, if any. Each of "B1", "B2", and "B3" similarly represents a block of substantially homopolymeric poly(conjugated diene) similarly formed in appropriate sequence by polymerization of the charge to substantial completion prior to the next step or charge. The subscript numbers indicate which step evolved the block or blocks. Each "L" indicates a residue from a monoalkali metal initiator remaining on the end of the polymerization chain prior to termination. The "L" subsequently is removed or displaced during coupling and/or termination when the above species groups form various combinations of coupled copolymeric species.

In another aspect of the invention, the following copolymeric species are considered to be formed prior to coupling:

Mode B
S1-B1-S2-B2-S3-B3-L
S3-B3-L.

In another aspect of the invention, the following copolymeric species are considered to be formed prior to coupling:

Mode C
S1-S2-B 1-S3-B2-L
S2-B1-S3-B2-L
S3-B2-L.

The final resinous polymodal product resulting from the polymerization procedure of the prescribed series of steps of additions of monomer/initiator/coupling may also result in proportions of terminated uncoupled species which escape coupling.

Of course, in addition to the sequence of addition of the monomers and of the initiator, it is important to control the amount of each monomer and initiator addition under each sequence above at each increment so that a suitable proportion of block sizes and proportion of polymodality is obtained in each mode. It is feasible to stretch out over an interval of time the addition of one or more of the increments of initiator and/or the input of the appropriate monovinylarene monomer charge, thus spreading (increasing) further the polymodality of the resulting product upon coupling.

Table I describes illustrative increments of monomers and of monoalkali metal initiator, using L to symbolize the monoalkali metal indicator, S for monovinylarene, and B for conjugated diene.

TABLE I

Ranges of Monomers and of Initiator Additions at each Increment

| | | Example 1 | Example 2 |
|---|---|---|---|
| Mode A | | | |
| Step IA | L-1 (phm)$^{(1)(1)}$ | 0.02-0.035 | 0.022-0.03 |
| | L-1 (mhm)$^{(3)(4)}$ | 0.3-0.55 | 0.34-0.47 |
| | S-1 (phm) | 30-45 | 35-41 |
| Step IB | B-1 (phm) | 0.6-9 | 2-4 |
| Step IIA | L-2 (phm) | 0.02-0.035 | 0.022-0.03 |
| | L-2 (mhm) | 0.3-0.55 | 0.34-0.47 |
| | S-2 (phm) | 10-20 | 12-18 |
| Step IIB | B-2 (phm) | 0.6-9 | 2-4 |
| Step III | L-3 (phm) | 0.07-0.18 | 0.1-0.15 |
| | L-3 (mhm) | 1.1-2.8 | 1.56-2.34 |
| | S-3 (phm) | 15-30 | 18-26 |
| Step IV | B-3 (phm) | 3.8-27 | 16-23 |
| Totals | S (phm) | 55-95 | 70-80 |
| | B(phm) | 45-5 | 30-20 |
| | L(phm) | 0.1-0.25 | 0.13-0.2 |
| | L(mhm) | 1.7-3.9 | 2.2-3.3 |
| Mode B | | | |
| Step IA | L-1 (phm) | 0.025-0.05 | 0.03-0.04 |
| | L-1 (mhm) | 0.39-0.78 | 0.47-0.63 |
| | S-1 (phm) | 30-45 | 35-40 |
| Step IIB | B-1 (phm) | 0.6-9 | 2-4 |
| Step IIA | S-2 (phm) | 10-20 | 13-18 |
| Step IIB | B-2 (phm) | 0.6-9 | 2-4 |
| Step III | L-2 (phm) | 0.1-0.25 | 0.12-0.17 |
| | L-2 (mhm) | 1.56-3.9 | 1.88-2.66 |
| | S-3 (phm) | 15-30 | 18-25 |
| Step IV | B-3 (phm) | 3.8-27 | 15-23 |
| Totals | S (phm) | 55-95 | 70-80 |
| | B (phm) | 45-5 | 30-20 |
| | L (phm) | 0.13-0.25 | 0.15-0.22 |
| | L (mhm) | 2.-4.7 | 2.3-3.4 |
| Mode C | | | |
| Step IA | L-1 (phm) | 0.02-0.04 | 0.024-0.035 |
| | L-1 (mhm) | 0.3-0.63 | 0.38-0.55 |
| | S-1 (phm) | 30-45 | 35-40 |
| Step IIA | L-2 (phm) | 0.02-0.04 | 0.025-0.035 |
| | L-2 (mhm) | 0.3-0.63 | 0.38-0.55 |
| | S-2 (phm) | 10-20 | 12-18 |
| Step IIB | B-1 (phm) | 1.2-18 | 4-8 |
| Step III | L-3 (phm) | 0.06-0.18 | 0.08-0.014 |
| | L-3 (mhm) | 0.94-2.8 | 1.25-2.19 |
| | S-3 (phm) | 15-30 | 20-25 |
| Step IV | B-2 (phm) | 3.8-27 | 15-22 |
| Totals | S (phm) | 55-95 | 70-80 |
| | B (phm) | 45-5 | 30-20 |
| | L (phm) | 0.1-0.26 | 0.13-0.2 |
| | L (mhm) | 1.5-4 | 2-3.3 |

$^{(1)}$phm = parts by weight per 100 parts by weight of total monomers.
$^{(2)}$phm for L is based only on n-butyllithium molecular weight.
$^{(3)}$mhm = gram-millimoles per 100 grams of total monomers.
$^{(4)}$mhm for L is applicable for any monoalkali metal initiator. The levels suggested are exclusive of requirements for any poisons in the solvent streams, such as traces of alcohols.

In one aspect, the compositions under the present invention include an acrylate terpolymer. In this context, an acrylate terpolymer refers to material that includes at least three components, the first being a monovinylarene, the second being an alkyl acrylate, and the third being and alkyl methacrylate, in no particular order. The components can be added by any suitable methods known in the art, such as blending or copolymerization. As an example, the acrylate terpolymer can be a block copolymer prepared by sequential free radical polymerization.

In one embodiment, the alkyl group of the alkyl acrylate comprises from 1 to about 8 carbon atoms. Exemplary alkyl acrylates include, but are not limited to, methyl acrylate, ethyl acrylate, propyl acrylate, and butyl acrylate, among others. In exemplary alkyl acrylates wherein the alkyl group can exist in a plurality of isomers (e.g., propyl and butyl, among others), all such isomers are within the scope of "alkyl acrylate," as used herein.

In one embodiment, the alkyl group of the alkyl methacrylate comprises from 1 to about 8 carbon atoms. Exemplary alkyl methacrylates include, but are not limited to, methyl methacrylate, ethyl methacrylate, propyl methacrylate, and butyl methacrylate, among others. In exemplary alkyl methacrylates wherein the alkyl group can exist in a plurality of isomers (e.g., propyl and butyl, among others), all such isomers are within the scope of "alkyl methacrylate," as used herein.

The proportion of monovinylarene units to alkyl acrylate units and alkyl methacrylate units in the acrylate terpolymer can be a proportion in the range of 5 mol %:95 mol % monovinylarene:alkyl acrylate units and alkyl methacrylate units to 95 mol %:5 mol % monovinyl arene:alkyl acrylate units and alkyl methacrylate units.

The total amount of alkyl acrylate units and alkyl methacrylate units in the acrylate terpolymer can comprise from about 5 wt % to about 25 wt % acrylate units, and from about 5 wt % to about 25 wt % alkyl methacrylate units. The alkyl acrylate and alkyl methacrylate together can comprise from about 10 wt % to about 25 wt % of the acrylate terpolymer.

The acrylate terpolymer copolymer can further comprise other units known in the art to be suitable for inclusion in such copolymers.

In the composition, in one embodiment, the composition can comprise 40-95 wt % of the monovinylarene-conjugated diene copolymer and 60-5 wt % of the acrylate terpolymer. In one embodiment, the composition can comprise from about 40 wt % to about 60 wt % of the monovinylarene-conjugated diene copolymer and from about 40 wt % to about 60 wt % of the acrylate terpolymer. In another embodiment, the composition can comprise from about 60 wt % to about 85 wt % of the monovinylarene-conjugated diene copolymer and from about 15 wt % to about 40 wt % of the acrylate terpolymer. In an additional embodiment, the composition can comprise from about 85 wt % to about 95 wt % of the monovinylarene-conjugated diene copolymer and from about 5 wt % to about 15 wt % of the acrylate terpolymer. The "wt %" units given here are relative to the total weights of the monovinylarene-conjugated diene copolymer and the acrylate terpolymer present in the composition. The weights of other components that can be present in the composition are not considered in the calculation of wt % in this context.

In another aspect, the composition can comprise a hindered phenolic stabilizer, e.g., from 0.05 wt % to 0.4 wt %, at least 0.1 wt %, at least 0.2 wt %, at least 0.3 wt %, etc. Suitable materials can include, but are not limited to, 2,6-di-t-butyl-4-methylphenol, n-octadecyl 3-(3,5-di-t-butyl-4-hydroxyphenyl)propionate, tetrakis [3-(3,5-di-t-butyl-4-hydroxyphenyl)propionyloxymethyl]methane, 1,3,5- trimethyl-2,4,5-tris (3,5-di-t-butyl-4-hydroxybenzyl) benzene, thiodiethylene bis (3,5-di-t-butyl-4-hydroxy) hydrocinnamate, N'N'-bis[3'5'di-t-butyl-4-hydroxyphenyl) propanyl-hydrazine, tris(3,5-di-t-butyl-4-hydroxybenzyl) isocyanurate, tris(2-methyl-4-hydroxy-5-t-butylphenyl) butane, tris(3-hydroxy-4-t-butyl-2,6-dimethylbenzyl) cyanurate, and mixtures thereof.

Further examples of suitable hindered phenolic stabilizers include, but are not limited to 2-(2-hydroxy-3-t-butyl-5-methylbenzy 1)-4-methyl-6-butylphenyl acrylate, 2-(2-hydroxy-3-t-butyl-5-methylbenzyl)-4-methyl-6-t-butylphenyl methacrylate, 2-(3,5-di-t-butyl-4-hydroxybenzyl)-4-methylphenyl methacrylate, 2-(3,5-di-t-butyl-4-hydroxybenzyl)-4-methylphenyl acrylate, 4-(3,5-di-t-butyl-4-hydroxybenzyl)phenyl acrylate, 2-(3,5-di-t-butyl-4-hydroxybenzyl) phenyl methacrylate, 2,6-bis(2-hydroxy-3-t-butyl-5-methylbenzyl)-4-methylphenyl methacrylate, 2-(1-(2-hydroxy-3,5-di-tert-pentylphenyl)ethyl)-4,6-di-tert-pentylphenyl acrylate, and mixtures thereof.

The polymers described above can be combined by any appropriate technique. In one embodiment, pellets of each polymer are combined by mechanical mixing prior to introduction of the mix into the plasticating screw of the converting equipment in use. One example of converting equipment is a sheet extruder. This mechanical mixing can be performed by stirring the polymer components, tumbling the components, simultaneous metering of the components, or by a combination of these techniques. The mechanical mixing can take place separate from or as an integral part of the feed hopper of the plasticizing screw of the converting equipment.

In another embodiment, the individual polymers can be introduced into a compounding extruder to produce pellets, each of which contains some quantity of each of the individual polymers. These compounded pellets may then be introduced into the plasticizing screw of the converting equipment in use. The compounding extruder melts the individual polymers and mixes them together in the molten state to produce pellets that are reasonably homogeneous in their blend composition. The individual polymers may be introduced into the compounding extruder through the feed hopper using the mechanical mixing techniques previously described, or by use of side feed extruders metering one or more of the melted components directly into the barrel of the compounding extruder.

In addition to the polymers described above, the composition can further comprise a solvent or solvents, one or more of various additives known in the art to be suitable for inclusion with such a composition, or the like, as a matter of routine experimentation for the ordinary skilled artisan.

The composition can be in any form, such as a film or one or more layers of a multilayer film. In one embodiment, the composition is in the form of a film having a machine direction or a transverse direction. Typically, a film can be produced by casting the film material from a die onto a roll. In such a case, the machine direction is a direction perpendicular to the axis of the roll, and the transverse direction is a direction parallel to the axis of the roll. In one embodiment, the film is a shrink film, that is, the film has been oriented in at least one direction. In a further embodiment, the film can be oriented in the machine direction or the transverse direction by stretching the film in the stated direction or directions. Orienting can be performed by techniques and apparatus known in the art.

A shrink film or shrink label, used interchangeably herein, is a film portion having a length, a width, and a thickness, wherein the length and the width are each at least an order of magnitude greater than the thickness and at least one of the length or the width will decrease upon exposure to heat. The term "shrink label" encompasses such a film portion before, during, or after heat exposure and decrease in the length or the width. Before heat exposure, the shrink label can be referred to as an "unshrunk shrink label" while also being a shrink label according to the definition given above. The length and width of the shrink label are not critical; the thickness can be any appropriate thickness, such as from about 0.1 mil to about 10 mil.

The shrink label can have a cylindrical structure. When the shrink label has a cylindrical structure, it can be termed a shrink sleeve.

Any geometry of the shrink label, in terms of size, shape, number of sides, radius, or the like, is contemplated, and will be matter of routine experimentation for the skilled artisan having the benefit of the present disclosure.

A film can be produced by any technique known in the art of monolayer and coextruded film making; and if the film is a shrink film, it can be oriented by any technique known in the art of uniaxial and biaxial orientation. A film can have a machine direction ("MD") (the direction in which the film comes off the production apparatus) and a transverse direction ("TD") (the direction perpendicular to the machine direction).

Generally, a shrink film oriented in the TD can be called a "sleeve label". In one embodiment, the sleeve label can be printed and slit in the MD direction. Solvent bonding can then be used to form a seam parallel to the TD and make a sleeve. The sleeve can be applied from the top of a container, resulting in the TD direction of the film around the circumference of the container. The materials making up a sleeve label can be chosen to have a desirable degree of shrinkage.

Generally, a shrink film oriented in the MD can be called a "roll fed" label. A roll fed label can be fed in the machine direction from a roll into a labeling machine. The labeling machine can wrap the roll fed label around a container, cut the roll fed label, and solvent bond the roll fed label, with the MD direction of the film around the circumference of the container.

Generally, a shrink film can be produced by sheet extrusion, followed by tentering; or blown or cast film techniques (with or without additional orientation steps). For example, a shrink film can be extruded on a sheet extrusion line to form a sheet. Molten polymer can flow from a flat die across the width of the line and onto a chill roll stack, which can cool the molten material. It can then be fed directly into an orienter or trimmed and wound onto a roll for later orientation. The sheet can be fed into a tentering frame for TD orientation, or an MD orienter, or both. Some tentering frames are capable of orienting the sheet in the MD and TD directions simultaneously. The finished film is typically about 0.2 times as thick as the extruded sheet, but this is an observation and not a statement limiting the present invention.

A shrink film can also be produced using conventional cast film extrusion techniques. In one embodiment of a cast process, molten material can flow from a flat die across the width of the line and onto a chilled drum, which can cool the molten material. It can then be trimmed and wound on a final drum into rolls of film. Typically, cast film has higher shrinkage in the machine direction than in the transverse direction, but this is solely an observation of typical films, and not a limiting description of the invention. Cast films can be oriented in the MD, TD, or both directions, as well. Commonly, orientation of cast films can be performed by film extrusion followed by tentering.

In a blown film process, the extrusion process upstream of the die can be similar to the cast process, but the die and downstream can be different. In an exemplary blown film process, the die can be annular (circular) and typically point upward. This can produce a cylindrical tube, which can be collapsed at the top, resulting in a flattened tube. In a "double bubble" process, the tube can be reinflated, reheated, stretched to introduce additional orientation, and recollapsed. A collapsed tube or recollapsed tube can have its edges removed and then be wound into separate rolls of film.

Multi-layer structures, produced by coextrusion, can be produced on sheet extrusion, blown film, or cast film equipment. In coextrusion, two or more polymers can be simultaneously extruded through one die. Two or more extruders can be used simultaneously to feed the die. In coextrusion, various polymer melts can be introduced into the die under conditions of laminar flow such that there is little intermixing, but bonding occurs at the interface between the film layers.

In one embodiment, an oriented film is provided from any of the various compositional aspect described above. The film is oriented at a temperature of less than 100° C., and can have a transverse direction shrink value greater than 20% at 100° C. (e.g., greater than 50%, 60%, 70%, etc.).

In another embodiment, an oriented film is provided from any of the various compositional aspect described above. The film is oriented at a temperature of less than 90° C., and can have a transverse direction shrink value greater than 20% at 100° C. (e.g., greater than 50%, 60%, 70%, etc.).

In another embodiment, an oriented film is provided from any of the various compositional aspect described above. The film is oriented at a temperature of less than 85° C., or in the range of 80-85° C., and can have a transverse direction shrink value greater than 20% at 100° C. (e.g., greater than 50%, 60%, 70%, etc.).

In another aspect of the invention, oriented films are provided as discussed above that have tear resistance greater than 8 g in the machine direction according to the Elmendorf Tear test of ASTM D 1922.

In another aspect of the invention, oriented films are provided as discussed above that have tear resistance greater than 11 g in the transverse direction according to the Elmendorf Tear test of ASTM D 1922.

In another aspect of the invention, oriented films are provided as discussed above that have a 1% secant modulus of at least 185,000 psi in the machine direction according to ASTM D882.

In another aspect of the invention, oriented films are provided as discussed above that have a 1% secant modulus of at least 128,000 psi in the transverse direction according to ASTM D882.

In another embodiment, the present invention relates to a container, comprising (a) a container structure having an exterior surface and (b) a shrink label in contact with at least a portion of the exterior surface, wherein the shrink label comprises (i) a monovinylarene-conjugated diene copolymer and (ii) an acrylate terpolymer.

The shrink label and its components and performance aspects have been described above.

The container structure can be any structure known in the art for use in storing or transporting a food, a beverage, or any other product. The container structure has an interior surface and an exterior surface, wherein at least a portion of the interior surface is in contact with the product and the exterior surface is generally in greater contact with the environment. The container structure also has an opening allowing liquid, solid, or gas communication between the volume defined by the container structure and the environment. The opening can be closed with a cap, cork, lid, or other closing item. The portion of the closing item in contact with the environment can be considered as a component of the exterior surface of the container structure. Common container structures include, but are not limited to, bottles, cartons, cups, trays, bags, and boxes, among others. Common materials from which container structures can be fabricated include, but are not limited to, glass, paperboard, cardboard, polypropylene, polystyrene, and polyethylene terephthalate, among others.

The container structure can have any shape. In particular exemplary embodiments, it can have a substantially cylindrical body, a curved body, a cubic body, a parellelepipedal body, or a relatively amorphous body, among others. Any of the foregoing container structures, or any others, can have a neck or gable-top of any shape or size. Any of the foregoing container structures, or any others, can have an opening of any shape or size. The opening of any container structure can be closed with a cap, cork, lid, or other closing item of any shape, size, and closing means. Exemplary closing means include, but are not limited to, screw caps, corks, pull-tabs, or lids, among others.

As stated above, the shrink label is in contact with at least a portion of the exterior surface of the container structure. In one embodiment, the portion of the exterior surface does not define the opening of the container structure. FIG. 1 shows a cross sectional view of an exemplary container structure according to this embodiment. The container structure 110 can be, e.g., a bottle formed from, e.g., polyethylene terephthalate. The opening can be sealed by a cap or other seal 112. The shrink label 120 can be in circumferential contact with the exterior of the container structure 110.

Figure 2:
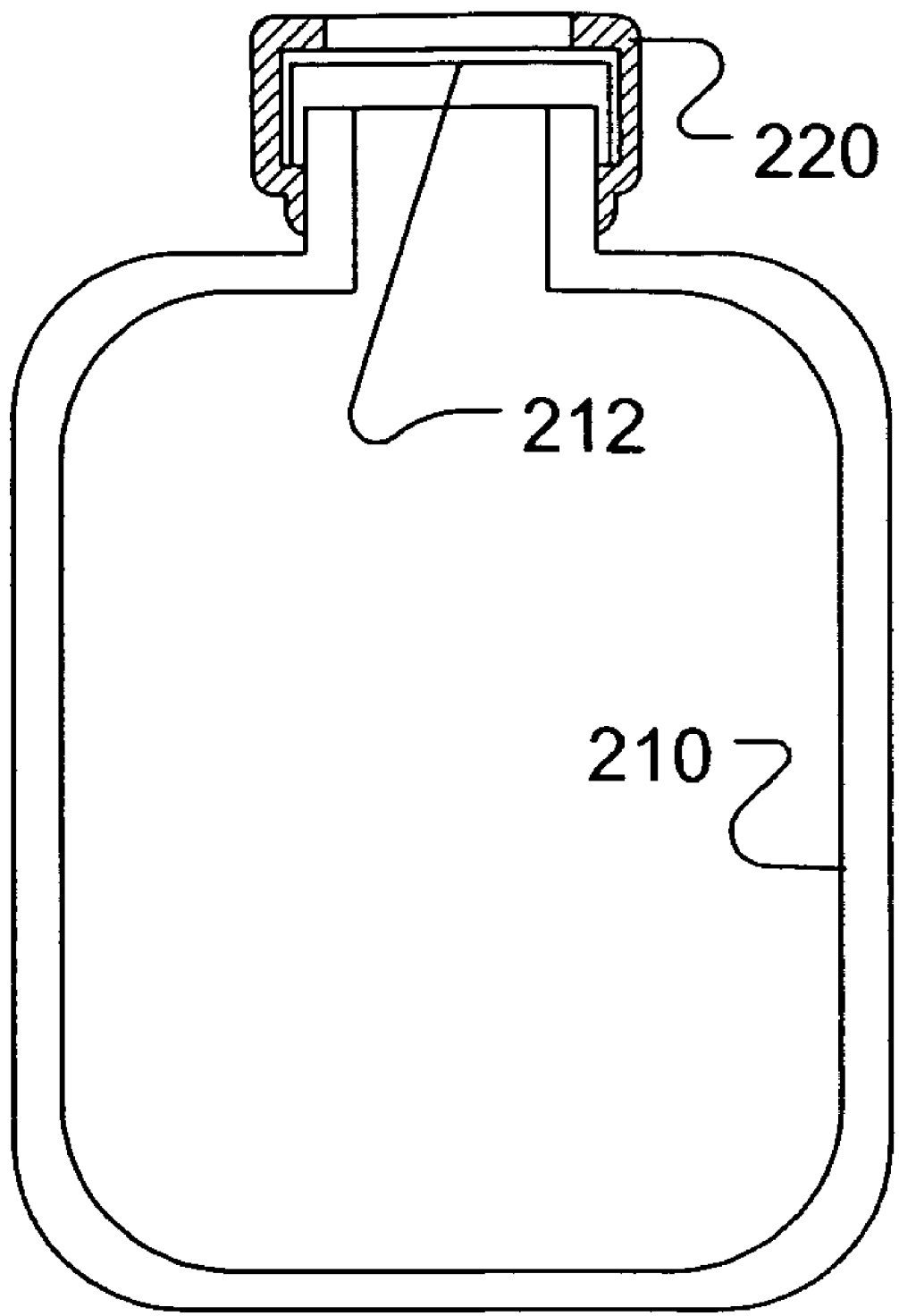
FIG. 2 presents a cross-sectional view of a container structure according to another embodiment of the present invention.

In another embodiment, the portion of the exterior surface defines the opening of the container structure. FIG. 2 shows a cross sectional view of an exemplary container structure according to this embodiment. The container structure 210 can be, e.g., a bottle formed from, e.g., polyethylene terephthalate. The opening can be sealed by a cap 212, and the shrink label 220 can be applied over the cap and adjacent portions of the exterior of the container structure. The shrink label 220 can form a tamper-evident or safety seal, such as are known for use in packaging pharmaceutical products and the like, although this is merely one possible use and it will be clear to the skilled artisan that the invention is not limited thereto.

As a reminder, the embodiments shown in FIGS. 1-2 are exemplary, and the invention is not limited thereto. Specifically, other container structure body shapes, openings, and closing items, as well as other arrangements of the shrink label relative to the container structure, are within the scope of the claims.

In another embodiment, the present invention relates to a method of applying a label to a container, comprising shrinking (a) a shrink label comprising (a-i) a monovinylarene-conjugated diene copolymer and (a-ii) an acrylate terpolymer to (b) at least a portion of the exterior surface of a container structure.

The shrink label and its components, and the container structure, have been described above. In one embodiment, the shrink label is a shrink sleeve.

The shrinking step involves positioning the unshrunk shrink label in proximity to the exterior surface of the container structure, followed by exposing the unshrunk shrink label to heat. The exposure to heat will lead to shrinking of the shrink label into contact with the exterior surface.

In one embodiment, positioning the unshrunk shrink label comprises wrapping the unshrunk shrink label around the container structure. This embodiment can be termed a "roll feed" embodiment.

In another embodiment, positioning the unshrunk shrink label comprises creating a sleeve from the unshrunk shrink label and sliding the sleeve over the container structure. This embodiment can be termed a "shrink sleeve" embodiment.

Figure 3:
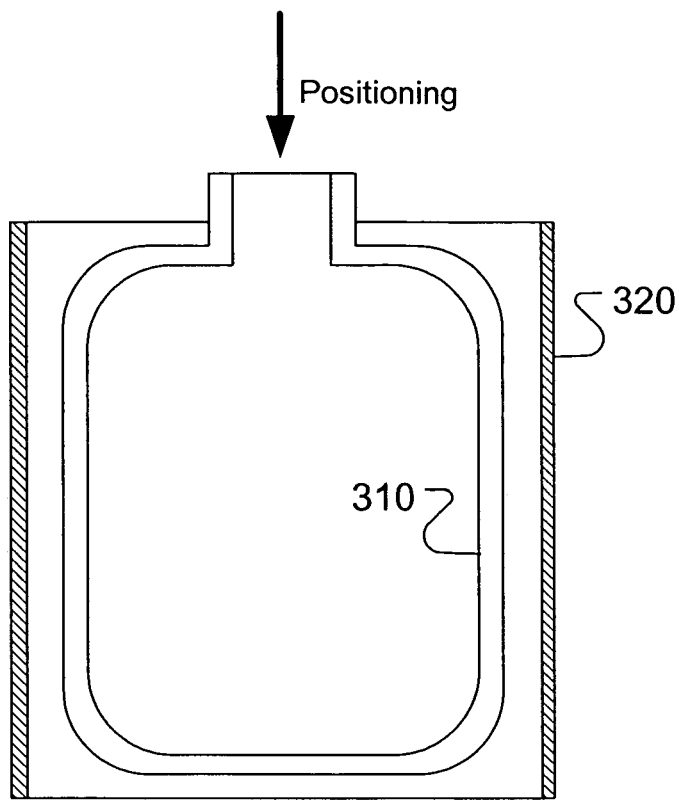
FIG. 3 presents a cross-sectional view of a container structure and shrink sleeve according to one method contemplated by the present invention.
Figure 3:
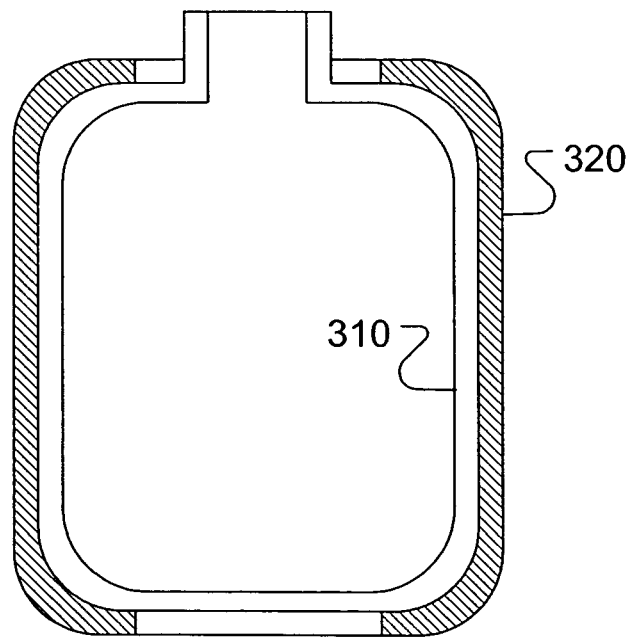

An example of the "shrink sleeve" embodiment is shown in FIG. 3. As shown in cross section, an unshrunk sleeve 320 is positioned around a container structure 310, to yield the arrangement shown in the upper portion of FIG. 3. After exposing to heat, the shrink sleeve 320 is shrunk to contact the exterior surface of the container structure 310. This embodiment is merely exemplary. Any portion of the exterior surface of the container structure can be contacted by the shrink sleeve after shrinking; the portion may, but need not, encompass any one or more of the bottom, the sides, the neck, or the cap or other closing item, among others.

Any temperature that can lead to shrinking of the shrink label can be used in the shrinking step. In one embodiment, the temperature is less than about 150° C. In a further embodiment, the temperature is less than about 100° C. In yet a further embodiment, the temperature is less than about 80° C.

The result of the shrinking step is the container structure with a shrink label adhered to its exterior surface.

EXPERIMENTAL PROCEDURES

The following procedures are included to demonstrate preferred experimental methods. It should be appreciated by those of skill in the art that the techniques disclosed represent techniques discovered to function well in the practice of the invention. However, those of skill in the art should, in light of the present disclosure, appreciate that many changes can be made while still obtaining a similar result without departing from the spirit and scope of the invention.

Materials

Cyclohexane is dried over activated alumina and stored under nitrogen. n-Butyl lithium initiator is received at 15 wt % in cyclohexane and diluted with cyclohexane to 2 wt %. Tetrahydrofuran (THF) is stored over activated alumina under nitrogen. Styrene and butadiene are purified over activated alumina. Epoxidized soybean oil is used as received.

Reactor

Polymerizations are performed in a 2-gallon stainless steel reactor. The reactor is equipped with a jacket for temperature control, a double auger impeller, and baffles.

Polymerization of Monovinylarene-Conjugated Diene Copolymer

Generally, each block is formed by polymerizing the monomer or mixture of monomers from which the desired units of the block are derived. The polymerization process will generally be amenable to a relative lack of change in process parameters between different blocks, but the skilled artisan, having the benefit of the present disclosure, may make some minor changes in process parameters between different blocks as a matter of routine experimentation. The following descriptions of the polymerization process will generally apply to the formation of all types of blocks in the inventive polymer, although certain descriptions may be of more or less value to forming one or more of the types of blocks in the inventive polymer.

Cyclohexane is initially charged to the reactor, followed by THF (0.10 PHM). The temperature is adjusted to ca. 60° C. and initiator is charged, followed by the first charge of styrene. After polymerization is complete a sample of the first polymerization block is coagulated in nitrogen-sparged isopropanol, filtered, dried, and analyzed by Gel Permeation Chromatography. The polymerization is continued by sequential charges of monomers and/or initiators as desired. The coupling agent is charged and reacted at 100° C. for 15 minutes. The polymer was recovered by solvent evaporation and pelletized with a single screw extruder.

More generally, the polymerization process can be carried out in a hydrocarbon diluent at any suitable temperature in the range of from about −100° C. to about 150° C., such as from about 0° C. to about 150° C., and at a pressure sufficient to maintain the reaction mixture substantially in the liquid phase. In one embodiment, the hydrocarbon diluent can be a linear or cyclic paraffin, or mixtures thereof. Exemplary linear or cyclic paraffins include, but are not limited to, pentane, hexane, octane, cyclopentane, cyclohexane, and mixtures thereof, among others.

The polymerization process can be carried out in the substantial absence of oxygen and water, such as under an inert gas atmosphere.

The polymerization process can be performed in the presence of an initiator. In one embodiment, the initiator can be any organomonoalkali metal compound known for use as an initiator. In a further embodiment, the initiator can have the formula RM, wherein R is an alkyl, cycloalkyl, or aryl radical containing 4 to 8 carbon atoms, such as an n-butyl radical, and M is an alkali metal, such as lithium. In a particular embodiment, the initiator is n-butyl lithium. Other initiators can also be used, including but not limited to sec-butyl lithium and t-butyl-lithium.

The amount of initiator employed can depend upon the desired polymer or block molecular weight, as is known in the art and is readily determinable, making due allowance for traces of reaction poisons in the feed streams.

Exemplary randomizers include, but are not limited to, dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, 1,2-dimethoxybenzene, tetrahydrofuran, potassium tert-amylate, dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylanine, triethylamine, tetramethylethylenediamine, tetraethylethylenediamine, N,N-di-methylaniline, N-methyl-N-ethylaniline, N-methylmorpholine, and mixtures thereof, among others.

When forming a particular block, each monomer charge or monomer mixture charge can be polymerized under solution polymerization conditions such that the polymerization of each monomer charge or monomer mixture charge, to form the particular block, is substantially complete before charging a subsequent charge. "Charging," as used herein, refers to the introduction of a compound to a reaction zone, such as the interior of a reactor vessel.

Though not to be bound by theory, if an initiator is included in a charge, a block will typically form either de novo or by addition to the end of an unterminated, previously-formed, block. Further not to be bound by theory, if an initiator is not included in a charge, a block will typically only form by addition to the end of an unterminated, previously-formed, block.

A coupling agent can be added after polymerization is complete. Suitable coupling agents include, but are not limited to, di- or multivinylarene compounds; di- or multiepoxides; di- or multiisocyanates; di- or multialkoxysilanes; di- or multiimines; di- or multialdehydes; di- or multiketones; alkoxytin compounds; di- or multihalides, such as silicon halides and halosilanes; mono-, di-, or multianhydrides; di- or multiesters, such as the esters of monoalcohols with polycarboxylic acids; diesters which are esters of monohydric alcohols with dicarboxylic acids; diesters which are esters of monobasic acids with polyalcohols such as glycerol; and mixtures of two or more such compounds, among others.

Useful multifunctional coupling agents include, but are not limited to, epoxidized vegetable oils such as epoxidized soybean oil, epoxidized linseed oil, and mixtures thereof, among others. In one embodiment, the coupling agent is epoxidized soybean oil. Epoxidized vegetable oils are commercially available under the tradename Vikoflex™ from Atofina Chemicals (Philadelphia, Pa.).

If coupling is to be performed, any effective amount of the coupling agent can be employed. In one embodiment, a stoichiometric amount of the coupling agent relative to active polymer alkali metal tends to promote maximum coupling. However, more or less than stoichiometric amounts can be used for varying coupling efficiency where desired for particular products.

Following completion of the coupling reaction, if any, the polymerization reaction mixture can be treated with a terminating agent such as water, carbon dioxide, alcohol, phenols, or linear saturated aliphatic mono-dicarboxylic acids, to remove alkali metal from the block copolymer or for color control.

After termination, if any, the polymer cement (polymer in polymerization solvent) usually contains about 10 to 40 weight percent solids, more usually 20 to 35 weight percent solids. The polymer cement can be flashed to evaporate a portion of the solvent so as to increase the solids content to a concentration of about 50 to about 99 weight percent solids, followed by vacuum oven or devolatilizing extruder drying to remove the remaining solvent.

The block copolymer can be recovered and worked into a desired shape, such as by milling, extrusion, or injection molding. The block copolymer can also contain additives such as antioxidants, antiblocking agents, release agents, fillers, extenders, dyes, etc.

Combination with Acrylate Components

As previously discussed, the monovinylarene-conjugated diene copolymer can be mixed or combined with the acrylate compositions by any of various methods known in the art. In one embodiment, the monovinylarene-conjugated diene copolymer is dry blended with the acrylate terpolymer, or with the separate components that would otherwise make up the acrylate terpolymer. The acrylate materials previously described are well known and readily available in commercial quantities, both as individual components of an acrylate terpolymer, or as a pre-formed acrylate terpolymer. One suitable example of an acrylate terpolymer is sold by Dainippon Ink Company under the trade name TS-10.

Performance Testing

Films are prepared by conventional methods, and tested for a range of glass transition temperature, haze, light transmission, MTS impact, and tensile strength, elongation, modulus, and shrinkage after exposure to various temperatures in both the machine direction and the transverse direction. The visual properties % Haze, % Light Transmission, and % Clarity are measured using a BYK Gardner Haze-Gard™ Plus instrument.

MTS Impact is a high speed puncture test, similar to that described by ASTM D3763. MTS Impact uses hydraulic actuation of the tup to achieve an approximately constant speed. The sample is clamped in an aperture of 3" diameter and a tup with 1.5" diameter is driven through the sample at a controlled speed. The tup penetrates the sample at a speed of approximately 100 inches per second. Transducers record the forces experienced by the tup and its position as a function of time, allowing calculation of the total energy required for the tup to penetrate the sample. This "Total Energy" measurement can be used as one comparative measure of toughness.

Tensile Break Strain is a lower speed test, measuring the amount of tensile elongation required to break the sample. The Tensile Break Strain testing used complies with the requirements of ASTM D638, using the Type IV specimen geometry and speed of 2 inches per minute. Elongation of the sheet sample is tested along both the extrusion machine direction, abbreviated as "MD," and a direction 90 degrees from MD, referred to as the transverse direction and abbreviated as "TD." Tensile Break Strain MD and Tensile Break Strain TD can be used as one comparative measure of toughness. Measurements of Tensile Break Strength comply with the requirements of ASTM D638, using the Type IV specimen geometry and speed of 2 inches per minute.

Secant modulus may also be measured, in accordance with ASTM D 882, which can essentially be described as the slope of a line drawn from the origin of the stress-strain diagram and intersecting the curve at the point of interest. The secant modulus can be used to describe the stiffness of a material, and is commonly denoted by Es.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention.

What is claimed is:

1. A composition, comprising:
   (i) a monovinylarene-conjugated diene copolymer;
   (ii) at least 5 wt % of an acrylate terpolymer;
   wherein the monovinylarene-conjugated diene copolymer comprises sequentially polymerized blocks of the monovinylarene and conjugated diene at a ratio of about 55 to 95 weight percent monovinylarene and 45 to 5 weight percent conjugated diene;
   wherein the monovinylarene-conjugated diene copolymer is formed by a sequential charge polymerization process including only separate monomer charges, wherein (a) at least two separate charges consist of said conjugated diene; (b) at least two separate charges consist of said monovinylarene; (c) at least two charges of a monoalkali metal initiator are employed; (d) at least one separate charge of each of said monovinylarene and of said conjugated diene follows the last charge of said monoalkali metal initiator; (e) at least one separate charge of conjugated diene precedes the last charge of monoalkali metal initiator; (f) each separate monomer charge homopolymerizes to substantial completion prior to addition of any subsequent charge; (g) the total of the number of separate charges of each of said conjugated diene, of said monovinylarene, and of said monoalkali metal initiator, is not in excess of 3; and (h) the copolymer is thereafter coupled with a polyfunctional coupling agent;

wherein the monovinylarene-conjugated diene copolymer comprises at least 0.3 wt % of a hindered phenolic stabilizer; and wherein the acrylate terpolymer comprises styrene, at least 10 wt % of an alkyl acrylate, and at least 5 wt % alkyl methacrylate.

2. The composition of claim 1, wherein the alkyl acrylate is butyl acrylate, and the alkyl methacrylate is methyl methacrylate.

3. The composition of claim 1, comprising from about 40 wt % to about 60 wt % of the monovinylarene-conjugated diene copolymer and from about 60 wt % to about 40 wt % of the acrylate terpolymer.

4. The composition of claim 3, wherein the monovinylarene-conjugated diene copolymer is a styrene-butadiene copolymer.

5. The composition of claim 4, wherein the styrene-butadiene copolymer is formed through a charge order of S-i-B-i-S-B-i-S-B-CA, where
i=hydrocarbyl monoalkali metal initiator,
S=monovinylarene monomer,
B=conjugated diene, and
CA=coupling agent.

6. The composition of claim 4, wherein the styrene-butadiene copolymer is formed through a charge order of S-i-B-S-B-i-S-B-CA, where
i=hydrocarbyl monoalkali metal initiator,
S=monovinylarene monomer,
B=conjugated diene, and
CA=coupling agent.

7. The composition of claim 4, wherein the styrene-butadiene copolymer is formed through a charge order of S-i-i-S-B-i-S-B-CA, where
i=hydrocarbyl monoalkali metal initiator,
S=monovinylarene monomer,
B=conjugated diene, and
CA=coupling agent.

8. The composition of claim 3, wherein the hindered phenolic stabilizer is selected from the group consisting of: 2,6-di-t-butyl-4-methylphenol, n-octadecyl3-(3,5-di-t-butyl-4-hydroxyphenyl)propionate, tetrakis [3-(3,5-di-t-butyl-4-hydroxyphenyl)propionyloxymethyl]methane,1,3,5-trimethyl-2,4,5-tris(3,5-di-t-butyl-4-hydroxybenzyl)benzene, thiodiethylene bis (3,5-di-t-butyl-4-hydroxy)hydrocinnamate, N'N'-bis[3'5'di-t-butyl-4-hydroxyphenyl)propanylhydrazine, tris(3,5-di-t-butyl-4-hydroxybenzyl)isocyanurate, tris(2-methyl-4-hydroxy-5-t-butylphenyl)butane, tris (3-hydroxy-4-t-butyl-2,6-dimethylbenzyl)cyanurate, and mixtures thereof.

9. The composition of claim 3, wherein the hindered phenolic stabilizer is selected from the group consisting of: 2-(2-hydroxy-3-t-butyl-5-methylbenzyl)-4-methyl-6butylphenyl acrylate, 2-(2-hydroxy-3-t-butyl-5-methylbenzyl)-4-methyl-6-t-butyiphenyl methacrylate, 2-(3,5-di-t-butyl-4-hydroxybenzyl)-4-methylphenyl methacrylate, 2-(3,5-di-t-butyl-4-hydroxybenzyl)-4-methylphenyl acrylate, 4-(3,5-di-tbutyl-4-hydroxybenzyl)phenyl acrylate, 2-(3,5-di-t-butyl-4-hydroxybenzyl)phenyl methacrylate,2,6-bis(2-hydroxy-3-t-butyl-5-methylbenzyl)-4-methylphenyl methacrylate,2-(1-(2-hydroxy-3,5-di-tert-pentylphenyl) ethyl)-4,6-di-tert-pentylphenyl acrylate, and mixtures thereof.

10. An oriented film formed from the composition of claim 1, wherein the film has a machine direction and a transverse direction; wherein the film has been oriented at a temperature of less than 100° C.; and wherein the film has a transverse direction shrink value greater than 20% at 100° C.

11. An oriented film formed from the composition of claim 1, wherein the film has a machine direction and a transverse direction; wherein the film has been oriented at a temperature of less than 100° C.; and wherein the film has a transverse direction shrink value greater than 50% at 100° C.

12. An oriented film formed from the composition of claim 1, wherein the film has a machine direction and a transverse direction; wherein the film has been oriented at a temperature of less than 90° C.; and wherein the film has a transverse direction shrink value greater than 20% at 100° C.

13. An oriented film formed from the composition of claim 1, wherein the film has a machine direction and a transverse direction; wherein the film has been oriented at a temperature of less than 90° C.; and wherein the film has a transverse direction shrink value greater than 50% at 100° C.

14. An oriented film formed from the composition of claim 1, wherein the film has a machine direction and a transverse direction; wherein the film has been oriented at a temperature of less than 90° C.; and wherein the film has a transverse direction shrink value greater than 70% at 100° C.

15. An oriented film formed from the composition of claim 1, wherein the film has a machine direction and a transverse direction; wherein the film has been oriented at a temperature of less than 85° C.; and wherein the film has a transverse direction shrink value greater than 20% at 100° C.

16. An oriented film formed from the composition of claim 1, wherein the film has a machine direction and a transverse direction; wherein the film has been oriented at a temperature of less than 85° C.; and wherein the film has a transverse direction shrink value greater than 50% at 100° C.

17. An oriented film formed from the composition of claim 1, wherein the film has a machine direction and a transverse direction; wherein the film has been oriented at a temperature of less than 85° C.; and wherein the film has a transverse direction shrink value greater than 70% at 100° C.

18. An oriented film formed from the composition of claim 1, wherein the film has a machine direction and a transverse direction; wherein the film has been oriented at a temperature in the range of 80-85° C.; and wherein the film has a transverse direction shrink value greater than 50% at 100° C.

19. The oriented film of claim 10, wherein the film has a tear resistance greater than 8 g in the machine direction according to the Elmendorf Tear test of ASTM D 1922.

20. The oriented film of claim 10, wherein the film has a tear resistance greater than 11 g in the transverse direction according to the Elmendorf Tear test of ASTM D 1922.

21. The oriented film of claim 10, wherein the film has a machine direction and a transverse direction; wherein the film has a 1% secant modulus of at least 185,000 psi in the machine direction according to ASTM D882.

22. The oriented film of claim 10, wherein the film has a machine direction and a transverse direction; wherein the film has a 1% secant modulus of at least 128,000 psi in the transverse direction according to ASTM D882.

23. The oriented film of claim 10, wherein the film has a 1% secant modulus of at least 185,000 psi in the machine direction according to ASTM D882, and wherein the film has a 1% secant modulus of at least 128,000 psi in the transverse direction according to ASTM D882.

24. An oriented film formed from the composition of claim 3, wherein the film has a machine direction and a transverse direction; wherein the film has been oriented at a temperature of less than 100° C.; wherein the film has a transverse direction shrink value greater than 50% at 100° C., wherein the film has a tear resistance greater than 8 g in the machine direction according to the Elmendorf Tear test of ASTM D 1922, and wherein the film has a tear resistance greater than 11 g in the transverse direction according to the Elmendorf Tear test of ASTM D 1922.

25. An oriented film formed from the composition of claim 5, wherein the film has a machine direction and a transverse direction; wherein the film has been oriented at a temperature of less than 100° C.; wherein the film has a transverse direction shrink value greater than 50% at 100° C., wherein the film has a tear resistance greater than 8 g in the machine direction according to the Elmendorf Tear test of ASTM D 1922, and wherein the film has a tear resistance greater than 11 g in the transverse direction according to the Elmendorf Tear test of ASTM D 1922.

26. An oriented film formed from the composition of claim 6, wherein the film has a machine direction and a transverse direction; wherein the film has been oriented at a temperature of less than 100° C.; wherein the film has a transverse direction shrink value greater than 50% at 100° C., wherein the film has a tear resistance greater than 8 g in the machine direction according to the Elmendorf Tear test of ASTM D 1922, and wherein the film has a tear resistance greater than 11 g in the transverse direction according to the Elmendorf Tear test of ASTM D 1922.

27. An oriented film formed from the composition of claim 7, wherein the film has a machine direction and a transverse direction; wherein the film has been oriented at a temperature of less than 100° C.; wherein the film has a ttansverse direction shrink value greater than 50% at 100° C., wherein the film has a tear resistance greater than 8 g in the machine direction according to the Elmendorf Tear test of ASTM D 1922, and wherein the film has a tear resistance greater than 11 g in the transverse direction according to the Elmendorf Tear test of ASTM D 1922.

28. An oriented film formed from the composition of claim 8, wherein the film has a machine direction and a transverse direction; wherein the film has been oriented at a temperature of less than 100° C.; wherein the film has a transverse direction shrink value greater than 50% at 100° C., wherein the film has a tear resistance greater than 8 g in the machine direction according to the Elmendorf Tear test of ASTM D 1922, and wherein the film has a tear resistance greater than 11 g in the transverse direction according to the Elmendorf Tear test of ASTM D 1922.

29. An oriented film formed from the composition of claim 9, wherein the film has a machine direction and a transverse direction; wherein the film has been oriented at a temperature of less than 100° C.; wherein the film has a transverse direction shrink value greater than 50% at 100° C., wherein the film has a tear resistance greater than 8 in the machine direction according to the Elmendorf Tear test of ASTM D 1922, and wherein the film has a tear resistance greater than 11 g in the transverse direction according to the Elmendorf Tear test of ASTM D 1922.

30. A container, comprising:
a container structure having an exterior surface; and
a shrink label in contact with at least a portion of the exterior surface, wherein the shrink label comprises:
(i) a monovinylarene-conjugated diene copolymer;
(ii) at least 5 wt % of an acrylate terpolymer; wherein the monovinylarene-conjugated diene copolymer comprises sequentially polymerized blocks of the monovinylarene and conjugated diene at a ratio of about 55 to 95 weight percent monovinylarene and 45 to 5 weight percent conjugated diene;
wherein the monovinylarene-conjugated diene copolymer is formed by a sequential charge polymerization process including only separate monomer charges, wherein (a) at least two separate charges consist of said conjugated diene; (b) at least two separate charges consist of said monovinylarene; (c) at least two charges of a monoalkali metal initiator are employed; (d) at least one separate charge of each of said monovinylarene and of said conjugated diene follows the last charge of said monoalkali metal initiator; (e) at least one separate charge of conjugated diene precedes the last charge of monoalkali metal initiator; (f) each separate monomer charge homopolymerizes to substantial completion prior to addition of any subsequent charge; (g) the total of the number of separate charges of each of said conjugated diene, of said monovinylarene, and of said monoalkali metal initiator, is not in excess of 3; and (h) the copolymer is thereafter coupled with a polyfunctional coupling agent;
wherein the monovinylarene-conjugated diene copolymer comprises at least 0.3 wt % of a hindered phenolic stabilizer; and
wherein the acrylate terpolymer comprises styrene, at least 10 wt % butyl acrylate, and at least 5 wt % methyl methacrylate.

31. The container of claim 30, wherein the portion of the exterior surface consists of at least one cap, pull-tab, cork, or lid closing an opening in the container structure.

32. A method of applying a label to a container, comprising: shrinking a film onto at least a portion of an exterior surface of a container structure, wherein the film comprises:
(i) a monovinylarene-conjugated diene copolymer;
(ii) at least 5 wt % of an acry late terpolymer;
wherein the monovinylarene-conjugated diene copolymer comprises sequentially polymerized blocks of the monovinylarene and conjugated diene at a ratio of about 55 to 95 weight percent monovinylarene and 45 to 5 weight percent conjugated diene;
wherein the monovinylarene-conjugated diene copolymer is formed by a sequential charge polymerization process including only separate monomer charges, wherein (a) at least two separate charges consist of said conjugated diene; (b) at least two separate charges consist of said monovinylarene; (c) at least two charges of a monoalkali metal initiator are employed; (d) at least one separate charge of each of said monovinylarene and of said conjugated diene follows the last charge of said monoalkali metal initiator; (e) at least one separate charge of conjugated diene precedes the last charge of monoalkali metal initiator; (f) each separate monomer charge homopolymerizes to substantial completion prior to addition of any subsequent charge; (g) the total of the number of separate charges of each of said conjugated diene, of said monovinylarene, and of said monoalkali metal initiator, is not in excess of 3; and (h) the copolymer is thereafter coupled with a polyfunctional coupling agent;

wherein the monovinylarene-conjugated diene copolymer comprises at least 0.3 wt % of a hindered phenolic stabilizer; and wherein the acrylate terpolymer comprises styrene, at least 10 wt % butyl acrylate, and at least 5 wt % methyl methacrylate.

33. The method of claim 32, wherein the portion of the exterior surface consists of at least one cap, cork, pull-tab, or lid closing an opening in the container structure.

34. A composition, comprising:
(i) from about 40 wt % to about 60 wt % of a monovinylarene-conjugated diene copolymer;
(ii) from about 60 wt % to about 40 wt % of an acrylate terpolymer;
wherein the acrylate terpolymer comprises styrene, at least 10 wt % of an alkyl acrylate, and at least 5 wt % alkyl methacrylate;
wherein the monovinylarene-conjugated diene copolymer comprises at least 0.3 wt % of a hindered phenolic stabilizer; and
wherein the monovinylarene-conjugated diene copolymer is formed through a charge order of S-i-B-i-S-B-i-S-B-CA, which includes only separate monomer charges, where
i=hydrocarbyl monoalkali metal initiator,
S=monovinylarene monomer,
B=conjugated diene, and
CA=coupling agent.

35. A composition, comprising:
(i) from about 40 wt % to about 60 wt % of a monovinylarene-conjugated diene copolymer;
(ii) from about 60 wt % to about 40 wt % of an acrylate terpolymer;
wherein the acrylate terpolymer comprises styrene, at least 10 wt % of an alkyl acrylate, and at least 5 wt % alkyl methacrylate;
wherein the monovinylarene-conjugated diene copolymer comprises at least 0.3 wt % of a hindered phenolic stabilizer; and
wherein the monovinylarene-conjugated diene copolymer is formed through a charge order of S-i-B-i-S-B-i-S-B-CA, which includes only separate monomer charges, where
i=hydrocarbyl monoalkali metal initiator,
S=monovinylarene monomer,
B=conjugated diene, and
CA=coupling agent.

36. A composition, comprising:
(i) from about 40 wt % to about 60 wt % of a monovinylarene-conjugated diene copolymer;
(ii) from about 60 wt % to about 40 wt % of an acrylate terpolymer;
wherein the acrylate terpolymer comprises styrene, at least 10 wt % of an alkyl acrylate, and at least 5 wt % alkyl methacrylate;
wherein the monovinylarene-conjugated diene copolymer comprises at least 0.3 wt % of a hindered phenolic stabilizer; and
wherein the monovinylarene-conjugated diene copolymer is formed through a charge order of S-i-B-i-S-B-i-S-B-CA, which includes only separate monomer charges, where
i=hydrocarbyl monoalkali metal initiator,
S=monovinylarene monomer,
B=conjugated diene, and
CA=coupling agent.

* * * * *